United States Patent [19]

Masiello

[11] 3,724,945
[45] Apr. 3, 1973

[54] SHEET FEEDING AND CUTTING DEVICE
[75] Inventor: Felix R. Masiello, Parsippany, N.J.
[73] Assignee: Addressograph-Multigraph Corporation, Cleveland, Ohio
[22] Filed: June 14, 1971
[21] Appl. No.: 152,835

[52] U.S. Cl. ..........................355/29, 83/438, 226/35
[51] Int. Cl. ..............................................G03b 29/00
[58] Field of Search ........355/27, 28, 29; 226/34, 35; 83/81, 109, 438

[56] References Cited

UNITED STATES PATENTS

| | | | |
|---|---|---|---|
| 3,218,918 | 11/1965 | Brindley et al. | 355/28 |
| 3,308,717 | 3/1967 | Okishima et al. | 355/28 |
| 3,289,532 | 12/1966 | Baumgarten et al. | 355/28 |
| 3,408,141 | 10/1968 | Grant, Jr. | 355/28 |

Primary Examiner—Samuel S. Matthews
Assistant Examiner—Richard A. Wintercorn
Attorney—Russell L. Root et al.

[57] ABSTRACT

An improved apparatus for processing web material is advantageously associated with a film magazine of a photocomposer and includes a guide assembly which prevents jamming of web material in the magazine. This guide assembly includes a guide element which is movable between an inactive position disposed to one side of a path of movement of a cutter edge in a shear assembly and an active position disposed in the path of movement of the cutter edge. The guide element is moved from the inactive position to the active position upon movement of the cutter edge through the path of movement of the sheet material. The web material is moved in a step-by-step manner past an exposure window by a pair of feed rollers to expose incremental portions of the web material to an original at the exposure window. To enable the extent of movement of the sheet material to be adjusted, at least one of the feed rollers is made of a resiliently yieldable elastomeric material so that the surface of the feed roller is deformable to greater and lesser extents. To facilitate loading of the web material in the magazine, a loading gate is movable from a closed position blocking access to the feed rollers to an open position.

18 Claims, 7 Drawing Figures

PATENTED APR 3 1973
3,724,945
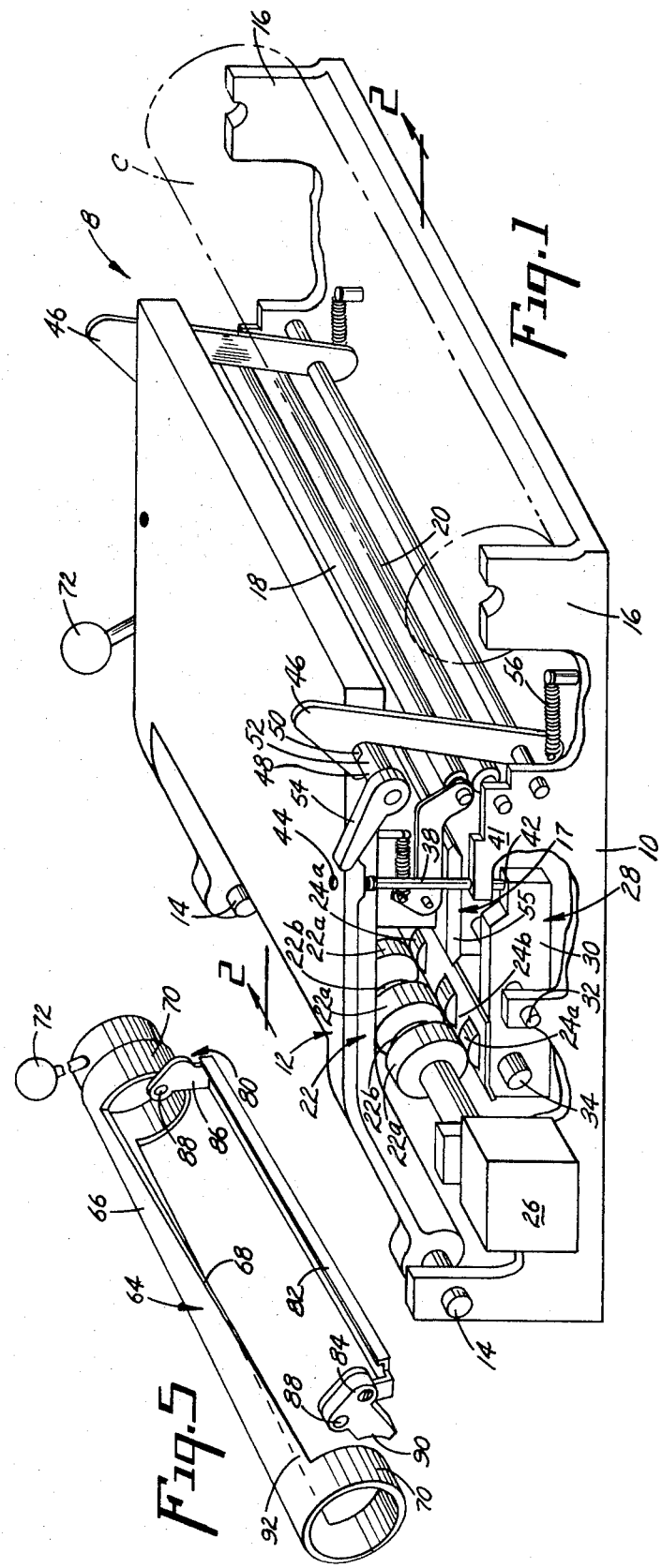
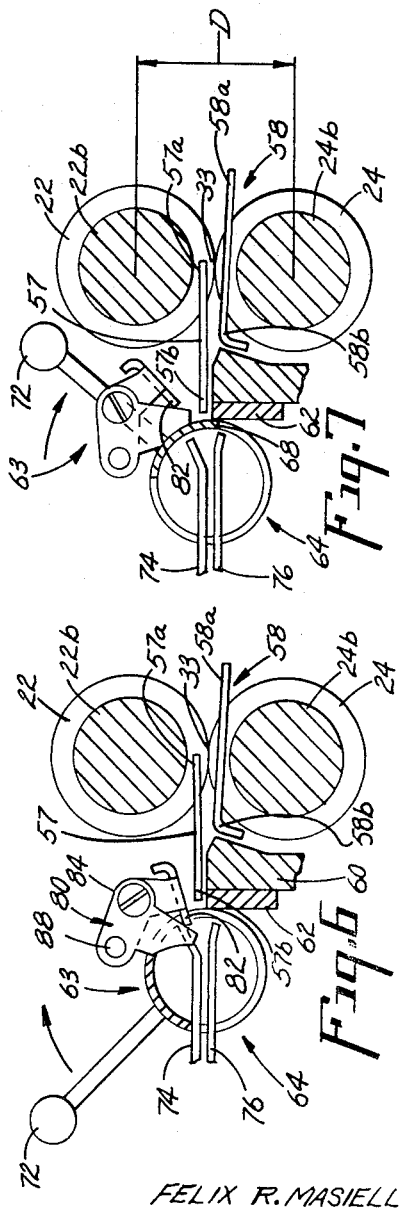
FELIX R. MASIELLO
INVENTOR
BY Ray S Pyle
ATTORNEY

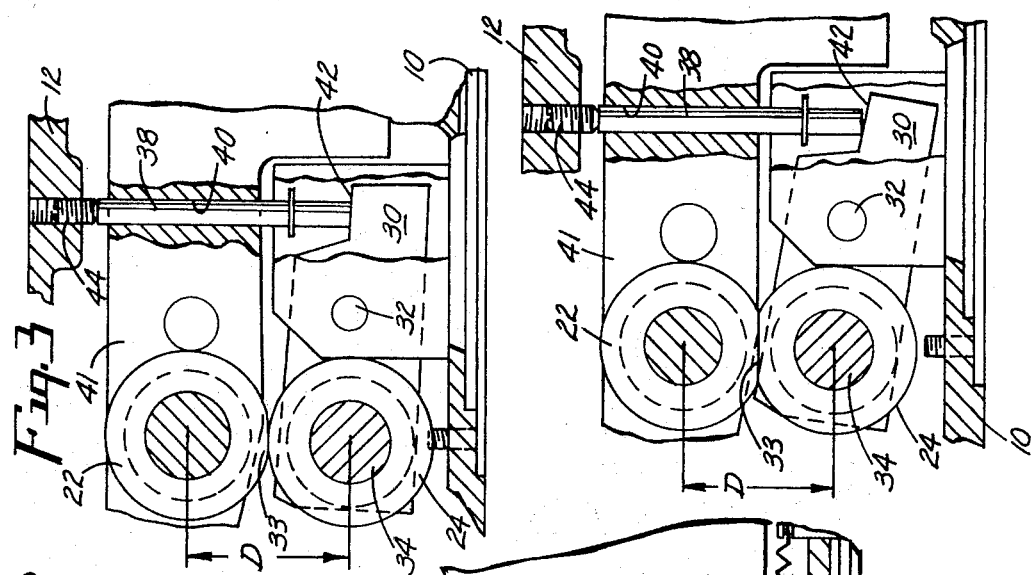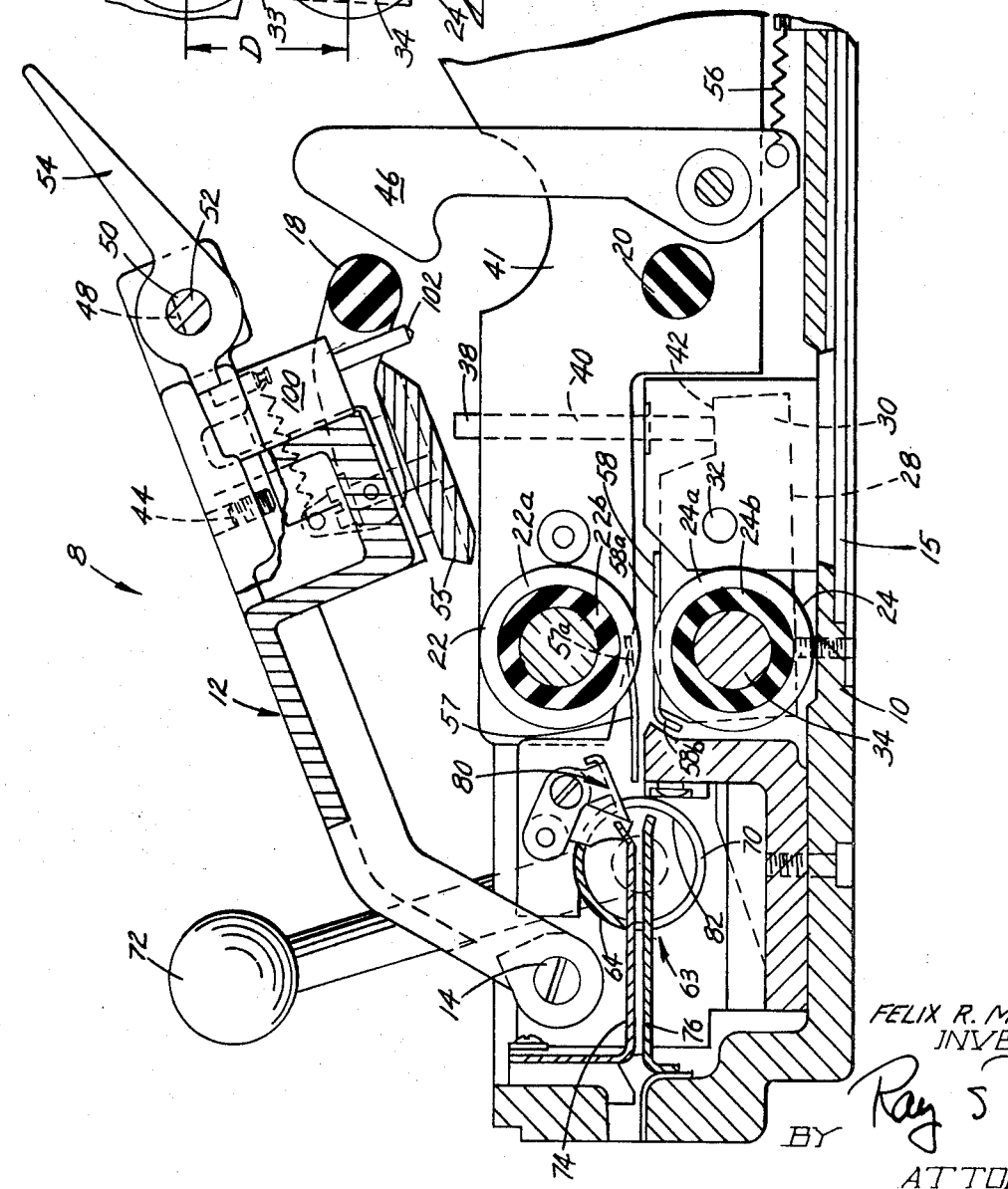

3,724,945

SHEET FEEDING AND CUTTING DEVICE

BACKGROUND OF THE INVENTION

This invention relates generally to sheet processing apparatus which includes an improved sheet feeding assembly, an improved cutter assembly, and an improved arrangement for positioning a sheet relative to the feeding and cutter assemblies.

There are many instances when it is desired to feed a specific incremental amount of a web of material and thereafter cut the material after the desired length has been fed. One such instance is in a photocomposer wherein a photosensitive sheet is composed by exposing the sheet to an original copy one line at a time and incrementally advancing the sheet after each line is exposed. At the end of each completed composition, the exposed sheet is sheared from the roll and delivered to a developer. In this field of photocomposition it is essential that an exact incremental advance be maintained for each line in order to obtain proper spacing of the lines. Also, it is necessary that the photosensitive sheet be fed smoothly along its path of travel without encountering any obstructions. When the sheet is sheared there is the tendency for the lead edge of the sheet to curl either up or down causing it to encounter an obstruction. This has been especially prevelent in the past in the region of the cutter where it has been necessary to leave an open space along the path of travel so that a cutter blade could move transversely to the path of travel and perform its cutting function.

SUMMARY OF THE INVENTION

It is an object of the present invention to provide a new and improved apparatus for processing web material and which may be used in association with a photocomposer film magazine or other devices and wherein the apparatus includes a sheet feeding device capable of providing a precisely controlled incremental amount of sheet feed.

Another object of this invention is to provide a new and improved apparatus for processing web material and which may be used in association with a photocomposer film magazine or other devices and wherein the apparatus includes a cutting assembly having a guide which prevents obstruction of a leading edge of a sheet in a region of a cut.

Another object of this invention is to provide a new and improved apparatus for processing web material and which may be used in association with a photocomposer film magazine or other devices and wherein the apparatus includes a loading gate which is movable from a closed position blocking access to a pair of feed rolls and an open position facilitating access to the feed rolls and an actuator for moving the feed rolls apart to facilitate loading of a sheet.

Another object of this invention is to provide a new and improved apparatus for processing web material and wherein the apparatus includes a cutter edge which is movable along a shear path to cut web material and a guide element which is movable between an inactive position disposed to one side of the shear path and an active position disposed in the shear path to enable the guide element to guide movement of a leading edge portion of the web material through the shear path after cutting of the web material.

Another object of this invention is to provide a new and improved apparatus for processing a web of material and wherein the apparatus includes feed rollers defining a nip through which the web material passes in pressure engagement with outer surfaces of the rollers, a first one of the feed rollers having an outer surface formed of a resiliently yieldable elastomeric material which is deformable to greater and lesser extents to vary the effective diameter of the feed rollers.

Another object of this invention is to provide a new and improved apparatus for processing a web of photosensitive material wherein the apparatus includes a loading gate, an exposure window for enabling incremental portions of the web material to be exposed to an original upon movement of each incremental portion of the web material in turn to a position adjacent to the exposure window, feed rollers defining a feed nip through which the photosensitive web of material passes, and an actuator for effecting operation of the feed rollers from an engaged position to a disengaged position opening the feed nip upon movement of the loading gate to its open position to facilitate positioning of the photosensitive web material relative to the feed rollers.

Another object of this invention is to provide a new and improved apparatus for processing a web of photosensitive material, the apparatus including an exposure window for enabling incremental portions of the material to be exposed to an original upon movement of each incremental portion of the material in turn to a position adjacent to the exposure window, a drive assembly for moving the material in a step-by-step manner to position successive incremental portions of the photosensitive web material adjacent to the exposure window, and wherein the drive assembly includes a pair of feed rollers at least one of which has a surface formed by a resiliently yieldable elastomeric material which is deformable to greater and lesser extents with variations in the pressure applied against the surface of the roller to vary the extent of movement of the sheet material along the path on each step of the drive means.

These and other objects and features of the invention will become more apparent upon consideration of the following description taken in connection with the accompanying drawings wherein:

FIG. 1 is a schematic perspective view, with parts broken away and parts removed for clarity, of a web processing apparatus constructed in accordance with the present invention;

FIG. 2 is a sectional view, taken generally along the line 2—2 of FIG. 1, illustrating a loading gate of the sheet processing apparatus in a partially open position;

FIG. 3 is a fragmentary illustration of web feeding rolls of the apparatus of FIG. 1, the feeding rolls being shown in relatively light pressure engagement at a sheet feed nip;

FIG. 4 is a fragmentary illustration, similar to FIG. 3, illustrating the feeding rolls in relatively heavy pressure engagement;

FIG. 5 is a perspective view of a cutting shear and sheet guide element of the apparatus of FIGS. 1 and 2;

FIG. 6 is a sectional view through the cutting shear and guide element with the shear in its retracted position and the guide element in its active position; and FIG. 7 is a view similar to FIG. 6 but with the shear shown in its shearing position and the guide element in its inactive position.

DESCRIPTION OF THE PREFERRED EMBODIMENTS

Referring now to the drawings, a photocomposer film magazine 8 having a web processing apparatus for feeding and cutting photosensitive strip material is shown in FIG. 1. However, the web processing apparatus of FIG. 1 can be utilized in conjunction with many devices other than film magazines. Also, the web feeding apparatus and the web cutting apparatus can each be used separately in association with photocomposer film magazines or other devices.

The web processing apparatus includes a base member 10 and a loading gate or cover 12. The loading gate 12 is pivotally mounted on the base member 10 by means of a pair of pivot pins 14. This allows the loading gate or cover to be opened for access to the interior for threading of a web of material. In the illustrated embodiment of the invention, the web material is photosensitive and is exposed to an original at a slit window 15 in the bottom of base 10.

At the rear of the base member 10 (to the right as viewed in FIG. 1) is provided a support or holder in the form of a pair of upstanding stanchions 16 which are adapted to support a coil of photosensitive material shown in phantom outline designated by reference character C. In the illustrated embodiment of the invention the coil C is open, but preferably should be contained in a supply magazine. The coil is moved in an incremental or step-by-step manner past the exposure window 15 to expose the web material line-by-line to a composition focused on an object plane in the window.

A conveyor means 17 in the form of a pair of guide rolls 18 and 20 and a pair of drive or feed rolls 22 and 24 move the web material past the exposure window 15. The roll 18 is mounted on the loading gate 12 and the roll 20 is mounted on the base member 10 so that when the loading gate 12 is opened, free access can be had between these rolls for inserting the web material. The feed roll 22 is journalled on the base section 10 and connected to a stepping drive designated by the box 26, to rotatively drive the roll 22 by uniform discrete steps. The lower feed roll 24 is mounted at both ends on a yoke assembly, one of which is shown in FIG. 1, and designated as 28. The opposite end of the lower drive roll 24 is mounted on an identical yoke assembly designated 28 in FIG. 2. At least one, and preferably both the rolls 22 and 24 are formed of a yieldable elastomeric material which will return to its original shape after deformation.

Each yoke assembly 28 includes a bar 30 pivotally mounted by a pivot pin 32 to the base member 10. The drive roll 24 is rotatively mounted on the bar 30 by a central shaft 34 at a position opposite pivot pin 32 from the position of roll C and forwardly of the pivot pins 32. Thus, the weight of the roll 24 tends to pivot the bar 30 in a counterclockwise direction (as viewed in FIGS. 1 and 2) about the pivot pin 32, thus tending to cause the roll 24 to move downwardly and away from the roll 22.

In order to press the rolls 22 and 24 together in a driving relationship at a nip 33 (FIG. 3), a pair of actuating pins 38 are provided, one for each yoke. The actuating pins 38 are each slidably mounted in a bore 40, formed in a base frame member 41. The actuating pin 38, at its lower end, engages a rear actuating surface 42 formed on the bar 30 and at its upper end the actuating pin 38 engages the end of a screw 44 (FIGS. 3 and 4) threaded into the loading gate 12.

When the loading gate 12 is opened, the screw 44 is out of engagement with the actuating pin 38 and thus the weight of the roll 24 causes the bars 30 to rotate to the open roll position shown in FIG. 2. In this open position of the rolls 22 and 24, the nip 33 is opened and the leading end or edge of a coil can be easily placed over roll 20 and between the rolls 22 and 24. Since the tension roll 18 is raised with the loading plate 12, the sheet material can be readily placed over the tension roll 20 (FIG. 2) and between the now separated feed rolls 22 and 24.

When the loading gate 12 is closed, the bottoms of the screws 44 engage the tops of the actuating pins 38 and the actuating pins 38 operate against the actuating surfaces 42 to cause the yokes 28 to rotate clockwise (as viewed in FIG. 2), forcing the lower roll 24 into pressure engagement with the upper roll 22 at the nip 33.

In order to maintain the loading gate 12 in a firmly closed position, a pair of catches 46 are provided which are pivotally mounted on the base member 10 and a locking bar 48 is mounted on the loading gate or cover 12. The locking bar 48 has a flat surface 50 and a cylindrical surface 52 (FIG. 1). The locking bar 48 is operable by a locking handle 54 which will rotate the locking bar 48. When the flat surface 50 is adjacent the catches 46 the catches can be pivoted against the bias of the spring 56 to release them from engagement with the locking bar, and thus the loading gate is free to open. However, when the locking bar 48 is rotated to bring the cylindrical surface 52 into engagement with the catches 46, a positive locking action thereagainst will occur in a conventional well known manner.

One of the requirements of the photocomposition machine is a precise feed length for each rotation or specific portion of rotation of the drive rolls 22 and 24. This precise adjustment is accomplished by adjusting the distance D between the centers of the drive rolls 22 and 24 (see FIGS. 3 and 4). The smaller the distance between the centers, the greater will be the amount of material fed per revolution of the roll; and conversely, the greater the distance between the centers of the rolls, the less will be the amount of material fed per revolution of the roll. This is because the lineal amount of the web material moved through the nip 33 increases with an increasing extent of circumferential pressure engagement between the web material and the resiliently deformable elastomeric surfaces of the feed rolls 22 and 24. Thus, by increasing the pressure engagement of the resiliently deformable feed rolls 22 and 24 from the relatively light engagement of FIG. 3 to the relatively heavy engagement of FIG. 4, the surfaces of the rolls are resiliently deformed to increase the circumferential extent of engagement between the rolls and the amount of the web material even though the angular rotation of the feed roll 22 remains constant.

The drive mechanism 26 is operated in a step-by-step manner to move the photosensitive web material in a timed or coordinated relationship with an exposing composition which takes place line-by-line in the exposure window 15 of the loading gate 12. Thus, the intermittent drive 26 moves an incremental portion of the photosensitive web material to a position adjacent a film platen 55 as a line of composition is exposed in an object plane in the exposure window 15. After exposing the photosensitive web material, the photosensitive web material is indexed again. Thus, as each line is composed and exposed, the drive 26 moves a next succeeding incremental portion of the photosensitive web material adjacent to the exposure window.

It is important to move the photosensitive web material through a precise desired incremental distance each time a line is exposed. To adjust the incremental distance through which the photosensitive web material is moved, it is merely necessary to change the distance D between the feed rolls 22 and 24. In order to change the distance D between the centers of the rolls 22 and 24, the vertical height of the screw 44 with respect to the actuating pin 38 is changed. This is accomplished by turning the screw 44 one way or the other to raise or lower it. The raising or lowering of the screw 44 will cause a greater or lesser movement of the actuating pin 38. This in turn will cause a greater or lesser pivotal movement of the bar 30 about the pivot pin 32; and since at least one of the rolls 22 and 24 is formed of a resilient material, it will yield against the other roll under the driving force exerted by the actuating pin 38. Thus by merely changing the location of the end of the screw 44 by twisting it, a very precise exact adjustment of the amount of feed per rotation of the roll can be accomplished.

It is also necessary to shear the web material after it has reached a predetermined length. Once a sheet has been cut from the material it is desirable to protect the web from meeting obstructions in the region of the shear once shearing has been completed. This is accomplished in the present invention by means of a shear and guide element arrangement shown in FIG. 5, and diagrammatically in FIGS. 6 and 7. The arrangement shown in FIG. 5 is actually located forwardly of the rolls 22 and 24 (as can be seen in FIGS. 2, 6 and 7) but it has been removed therefrom in FIG. 1 for clarity of illustration and shown separately in perspective in FIG. 5.

In order to guide the front or leading edge of the sheet through the rolls 22 and 24, the rolls are formed of cylindrical portions 22a and 24a which are axially separated by annular grooves 22b and 24b (FIG. 1). Upper and lower guides 57 and 58 are provided as shown in FIGS. 6 and 7. The guide 57 is disposed above the path of sheet travel and includes fingers 57a extending from a guide plate 57b into the grooves 22b. Similarly, the guide 58 is disposed below the path of sheet travel and includes fingers 58a extending from a guide plate 58b into the grooves 24b (see FIGS. 6 and 7). The guide plates 57 and 58 provide a guided path of travel through the feed rolls 22 and 24 to the cutter or shear assembly 63.

A movable shear blade assembly 64 (FIG. 5) is provided which, in conjunction with the knife 62 will operate to shear the web material. The shear blade assembly 64 includes a generally tubular member 66 which is formed to have a diagonally extending shear edge 68. Tubular end portions 70 (FIG. 5) pivotally mount the tubular member 66 so that when the tubular member 66 is rotated by means of operating handle 72 (FIG. 7), the shear edge 68 in conjunction with the stationary knife 62 performs a shearing function. Following the shearing, the front edge of the severed web, upon further feed advance, enters into a pair of upper and lower guide plates 74 and 76 which extend through the removed center portion of the tubular member 66 and at their ends thereof they are turned slightly to form a bell-mouth configuration as can be seen in FIGS. 6 and 7.

In order for the shear to perform a shearing function, the edge 68 must necessarily move on a path transverse to the material being sheared. This requires an opening or access to the material on this path of travel. Such opening or access, if not developed as in this invention, will provide a space for the material to curl up and leave its path of travel and become hung up on the shear or the associated components. A guide element 80 is provided which closes this access opening when the shear is in the home or inoperative position but which swings out of the way to allow the shear access to move on a shearing path of travel.

The guide element 80 includes a guide bar 82 mounted on a pair of end brackets 84 and 86. (See FIG. 5). The end brackets 84 and 86 are in turn pivotally mounted by pivot pins 88 to the base member 10. The end bracket 84 also acts as a cam member having a cam surface 90 formed thereon (FIG. 5). The cam surface 90 is disposed to coact with the outer tubular surface 92 on the tubular member 66 adjacent the shear surface 68 at one end thereof.

When the tubular member 66 is rotated to start its shearing action the outer tubular surface 92 comes in contact with the cam surface 90 which causes the end bracket 84 to pivot about the pivot pin 88. This will cause the guide bar 82, which is secured thereto, to pivot in a counterclockwise direction as viewed in FIGS. 5, 6 and 7 from the active position shown in FIG. 6 to the inactive position shown in FIG. 7. The guide bar 82 is thus moved from its blocking or active position when the shear is in the retracted position to an inactive position allowing the shear to move on a transverse path to shear the strip of material. When the guide bar is in the active position of FIG. 6 it overlaps the upper guide plate 57 to form a guide channel to prevent upward jamming of the leading end portion of a sheet.

Once shearing or cutting has been completed the tubular member 66 can be rotated back and the guide bar 82 will then return to the blocking position. Thus when the shear 63 is retracted, the path of travel of the shear knife is blocked to prevent the edge of the sheet turning up into this opening, whereas this path of travel is opened during shearing movement to provide for cutting of the material.

The shape and position of the guide bar 82 forms a generally bell-mouthed configuration with respect to the knife support block 60 and knife 62 and also provides a general extension of the bell-mouthed configuration formed by the guide bars 74 and 76.

From the foregoing description, it can be seen that the improved apparatus for processing web material includes improved cutter assembly 63 for cutting the web material, an improved feed roll arrangement 22 and 24, and an improved loading gate 12. The improved cutter assembly 63 includes a guide or baffle element 82 which is movable from an inactive position (FIG. 7) disposed to one side of the path of movement of a cutter blade 64 to an active position disposed in the path of movement of the cutter blade. In the active position, the guide element 82 prevents the web material from becoming obstructed by the cutter blade and promotes a smooth flow of the web material through the cutter assembly 63. The smooth flow of the web material through the cutter assembly and the feed rolls 22 and 24 is further promoted by the guide fingers 57a and 58a which extend into the grooves 22b and 24b formed in the feed rollers 22 and 24. While this cutter and guide arrangement has been found to be particularly advantageous in a photocomposer film magazine, the cutter guide arrangement could be utilized in other environments wherein it is desirable to prevent obstruction of sheet or paper movement due to jamming of end portions of a cut sheet with the cutter assembly.

The feed rollers 22 and 24 provide an improved sheet feeding assembly which can be utilized either with the cutter assembly 63 or separately therefrom. However, it has been found that the combination of the improved feed rolls 22 and 24 and the cutter assembly 63 is particularly advantageous in a photocomposer film magazine wherein a precise registration must be obtained between the web material and an original as the original is moved line-by-line and the sheet material is stepped in a coordinated relationship therewith. The improved feed rollers 22 and 24 are formed of a resiliently deformable elastomeric material and are mounted on axles which are movable toward and away from each other to vary the pressure relationship between the rollers and the speed of movement of the web material through a feed nip 33.

To facilitate loading of the web materials in the film magazine 8 or other apparatus, a loading gate or cover 12 is movable from a closed position (see FIG. 1) to a fully open position (the loading gate 12 being shown in a partially opened position in FIG. 2). When the loading gate 12 is fully opened, the tension roll 18 is separated from the tension roll 20 to enable the sheet material to be positioned between the tension rolls. In addition, the feed rolls 22 and 24 are moved apart (see FIG. 2) so that the sheet material can be readily positioned between the rolls. A sheet detector switch 100 having a detector member 102 (FIG. 2) is advantageously mounted on the loading gate 12 for movement therewith. When the loading gate 12 is returned to the closed position of FIG. 1, the detector member 102 will engage the web material and hold the switch 100 in an actuated condition. When the trailing end of the sheet material passes the detector 102, it will move downwardly and open the switch 100 to interrupt operation of the apparatus associated with the film magazine 8.

What is claimed is:

1. An apparatus for processing web material, said apparatus comprising conveyor means for moving the web material along a predetermined path, shear means located along the predetermined path for cutting the web material, said shear means including a cutter edge movable along a shear path to cut the web material, guide means for guiding movement of a leading edge portion of the web material through said shear path after cutting of the web material by said shear means, said guide means including a guide element movable between an inactive position disposed out of the shear path and an active position disposed in the shear path, actuator means for moving said guide element from the inactive position to the active position in response to movement of said cutter edge through the path of movement of the web material, said shear means further includes a stationary cutter edge located immediately adjacent to said shear path for cooperating with said movable cutter edge to cut the web material, and said guide element in the active position extending through said shear path at a location therealong which is intermediate said movable cutter edge and said stationary cutter edge.

2. An apparatus as set forth in claim 1 further including means for moving said cutter edge in one direction through the path of movement of the web material and for thereafter moving said cutter edge through the path of movement of the web material in a direction opposite to said one direction, said actuator means including means for moving said guide element from the active position to the inactive position immediately prior to movement of said cutter edge through the path of movement of the web material in said one direction and for moving said guide element from the inactive position to the active position immediately after movement of said cutter edge through the path of movement of the web material in said opposite direction.

3. Apparatus as set forth in claim 1 wherein said shear means includes an arcuate blade with said cutter edge formed thereon, means supporting said arcuate blade for reciprocating movement along an arcuate shear path, and means for moving said arcuate blade along the arcuate shear path, said actuator means including cam means operatively connected with said guide element for engaging said arcuate blade and moving said guide element from the active position to the inactive position under the influence of forces transmitted from said arcuate blade to said cam means during movement of said arcuate blade along the arcuate shear path.

4. An apparatus as set forth in claim 1 wherein said conveyor means includes a pair of feed rollers defining a nip through which the web material passes, at least one of said feed rollers including a plurality of cylindrical portions which are axially spaced apart by a plurality of grooves and are mounted for rotation about a common axis, said apparatus further including feed roll guide means for guiding the web material relative to said nip, said feed roll guide means including a plurality of guide fingers disposed on one side of the path of sheet travel and extending into the grooves formed in said one of said feed rollers.

5. An apparatus as set forth in claim 4 wherein said feed roll guide means includes a guide plate interconnecting said guide fingers and extending along the path of movement of the web material into an overlapping relationship with said guide element when said guide element is in the active position to guide the web material from said nip to said shear means.

6. An apparatus as set forth in claim 1 wherein said conveyor means includes first and second feed rollers defining a nip through which the web material passes, each of said feed rollers including a plurality of cylindrical portions which are axially spaced apart by a plurality of grooves and are mounted for rotation about a common axis, said apparatus further including feed roll guide means for guiding movement of the web material to and from said nip, said feed roll guide means including a first guide plate disposed on one side of the path of movement of the sheet material and on an upstream side of said feed rollers, a first plurality of guide fingers extending downstream from said first guide plate and into the grooves formed in said first feed roller, a second guide plate disposed on a side of the path of movement of the sheet material opposite the one side and on a downstream side of said feed rollers, and a second plurality of guide fingers extending upstream from said second guide plate and into the grooves formed in said second feed roller.

7. An apparatus as set forth in claim 6 wherein said cylindrical portions of said first feed roller have outer surfaces formed by a resiliently yieldable elastomeric material which is deformable to greater or lesser extents with variations in pressure applied against the surfaces of said cylindrical portions of said first feed roller at said nip to vary the extent of circumferential pressure engagement between said cylindrical portions of said first feed roller and the web material as the web material passes through said nip, drive means for rotating said feed rollers at a predetermined rotational speed, and control means for adjusting the position of at least one of said feed rollers in a generally radial direction relative to the other of said feed rollers to adjust the pressure applied against the surfaces of said cylindrical portions of said first feed roller and the extent of circumferential pressure engagement between the surface of said first feed roller and the web material.

8. An apparatus as set forth in claim 1 further including a base member and cover member mounted thereon for movement between an open position to allow access to said conveyor means and a closed position for operation of said apparatus, said conveyor means including a pair of feed rolls and mounting means mounting said feed rolls on said base member, at least one of said feed rolls being formed of a resilient elastomeric material, said mounting means including means for moving said rollers between an engaged position for conveying the web material and a disengaged position for loading the web material, cooperating means between said cover member and said rolls for moving said rolls to the engaged position when the cover member is in its closed position and the disengaged position when the cover member is in its open position, and means for varying the distance between the axes of said rolls in their engaged position.

9. An apparatus for processing web material, said apparatus comprising conveyor means for moving the web material along a predetermined path, said conveyor means including first and second feed rollers defining a feed nip through which the web of material passes in pressure engagement with outer surfaces of said feed rollers, said first feed roller having an outer surface formed by a resiliently yieldable elastomeric material which is deformable to greater and lesser extents with variations in the pressure applied against the web material at said feed nip by said first feed roller to vary the extent of circumferential pressure engagement between the surface of said first feed roller and the sheet material, drive means for rotating at least one of said feed rollers at a predetermined rate, and control means for adjusting the speed of movement of the web material through said feed nip during rotation of said one feed roller at the predetermined rate by said drive means, said control means including means for adjusting the position of at least one of said feed rollers in a generally radial direction to the other feed roller to adjust the pressure applied against the surface of said first feed roller and vary the extent of circumferential pressure engagement between said first feed roller and the web of material.

10. An apparatus as set forth in claim 9 further including shear means located along the predetermined path downstream from said feed nip for cutting the web material, said shear means including a cutter edge movable along a shear path to cut the web material, guide means for guiding the web material from said feed nip through said shear path, said guide means including a guide element movable between an inactive position disposed out of the shear path and an active position disposed in the shear path to guide movement of a leading edge portion of the web material through the shear path after cutting of a sheet from the web material by said shear means, and actuator means for moving said guide element from the inactive position to the active position in response to movement of said cutter edge through the path of movement of the web of material.

11. An apparatus as set forth in claim 10 wherein said first feed roller includes a plurality of cylindrical portions which are axially spaced apart by a plurality of grooves and are mounted for rotation about a common axis, said guide means including a plurality of guide fingers disposed on one side of the path of sheet travel and extending into the grooves formed in said first feed roller to guide movement of the web material from said feed nip toward said shear means.

12. An apparatus as set forth in claim 11 wherein said guide means further includes a guide plate interconnecting said guide fingers and extending along the path of movement of the web material into an overlapping relationship with said guide element when said guide element is in the active position.

13. An apparatus for processing web material as set forth in claim 9 further including means supporting said feed rollers for operation between an engaged condition in which said feed rollers are disposed in a pressure relationship with each other at said feed nip and a disengaged condition in which said feed rollers are out of the pressure relationship and are radially spaced apart to open said feed nip, a loading gate movable relative to said conveyor means from a closed position at least partially blocking access to said feed rollers and an open condition providing access to said feed rollers, and actuator means for effecting operation of said feed rollers from their engaged condition to their disengaged condition upon movement of said loading gate from its closed position to its open position to facilitate positioning of the web material relative to said feed rollers and for effecting operation of said feed rollers from their disengaged condition to their engaged condition upon movement of said loading gate from its open position to its closed position to engage the web material with said feed rollers at said feed nip.

14. An apparatus for processing photosensitive sheet material, said apparatus comprising a base, holder means connected with said base for holding a supply web of photosensitive web material, conveyor means for moving the web material along a predetermined path relative to said base, a loading gate operatively connected with said base and movable between a closed position at least partially blocking access to said conveyor means and an open position providing access to said conveyor means, said base including window means defining an exposure window for enabling incremental portions of the web material to be exposed upon movement of each incremental portion of the web material in turn to a position adjacent to said exposure window with said loading gate in the closed position, intermittently operable drive means connected with said base for advancing the photosensitive web material in a step-by-step manner to move successive incremental portions of the photosensitive web material along the path to a position adjacent the exposure window on successive steps of operation of said drive means, for interrupting movement of the web with an incremental portion of the photosensitive web material adjacent to said exposure window, and for moving a next succeeding incremental portion of the photosensitive web material to a position adjacent the exposure window after exposure of an incremental portion of the photosensitive web material, said drive means including first and second feed rollers defining a feed nip through which the photosensitive web material passes, said feed rollers being operable between an engaged condition in which said feed rollers are disposed in a pressure relationship with each other at said feed nip and a disengaged condition in which said feed rollers are out of the pressure relationship and are radially spaced apart to open said feed nip, and actuator means for effecting operation of said feed rollers from their engaged condition to their disengaged condition upon movement of said loading gate from its closed position to its open position to facilitate positioning of the photosensitive web material relative to said feed rollers and for effecting operation of said feed rollers from their disengaged condition to their engaged condition upon movement of said loading gate from its open position to its closed position to engage the photosensitive web material with said feed rollers at said feed nip with the photosensitive web material in a predetermined relationship with said exposure window.

15. An apparatus as set forth in claim 14 wherein said first feed roller has a surface formed by a resiliently yieldable elastomeric material which is deformable to greater and lesser extents with variations in the pressure applied against the surface of said first feed roller to vary the extent of circumferential pressure engagement between the surface of said first feed roller and the photosensitive web material when said loading gate is in the closed position, and control means for adjusting the extent of movement of the photosensitive web material along the path on each step of said drive means, said control means including means for adjusting the position of at least one of said feed rollers in a generally radial direction relative to the other feed roller to adjust the pressure applied against the surface of said first feed roller and the extent of circumferential pressure engagement between the surface of said first feed roller and the photosensitive web material.

16. An apparatus as set forth in claim 14 further including shear means operatively connected with said base and located along the predetermined path downstream from said feed nip for cutting the photosensitive web material after exposure of the web material to an original at said exposure window, said shear means including a cutter edge movable along a shear path to cut the web material, guide means for guiding the photosensitive web material from said feed nip through said shear path, said guide means including a guide element movable between an inactive position disposed to one side of the shear path and an active position disposed in the shear path to guide movement of a leading edge portion of the photosensitive web material through the shear path after cutting of the photosensitive web material by said shear means, and actuator means for moving said guide element from the inactive position to the active position upon movement of said cutter edge through the path of movement of the photosensitive web material.

17. An apparatus for processing photosensitive web material, said apparatus comprising a base, holder means connected with said base for holding a web supply of photosensitive web material, window means defining an exposure window for enabling incremental portions of the web material to be exposed to an original upon movement of each incremental portion of the web material in turn to a position adjacent to said exposure window, intermittently operable drive means connected with said base for advancing the photosensitive web material in a step-by-step manner to move successive incremental portions of the photosensitive web material along the path to a position adjacent the exposure window on successive steps of operation of said drive means, for interrupting movement of the web with an incremental portion of the photosensitive web material adjacent to said exposure window, and for moving a next succeeding incremental portion of the photosensitive web material to a position adjacent the exposure window after exposure of an incremental portion of the photosensitive web material, said drive means including first and second rollers defining a nip through which the photosensitive web material passes in pressure engagement with surfaces of said rollers, said first roller having a surface formed by a resiliently yieldable elastomeric material which is deformable to greater and lesser extents with variations in the pressure applied against the surface of said first roller to vary the extent of circumferential pressure engagement between the surface of said first roller and the photosensitive web material, and control means for adjusting the extent of movement of the photosensitive web material along the path on each step of said drive means, said control means including means for adjusting the position of at least one of said rollers in a generally radial direction relative to the other roller to adjust the pressure applied against the surface of said first roller and the extent of circumferential pressure engagement between the surface of said first roller and the photosensitive web material.

18. An apparatus as set forth in claim 17 further including shear means downstream from said nip for cutting the photosensitive web material, said shear means including a cutter edge movable along a shear path to cut the photosensitive web material, guide means for guiding the photosensitive web material from said nip through said shear path, said guide means including a guide element movable between an inactive position disposed to one side of the shear path and an active position disposed in the shear path to guide movement of a leading edge portion of the photosensitive web material through the shear path after cutting of the web material by said shear means, and actuator means for moving said guide element from the inactive position to the active position after cutting of the photosensitive web material with said shear means.

* * * * *

Disclaimer 3,724,945.—*Felix R. Masiello*, Parsippany, N.J. SHEET FEEDING AND CUTTING DEVICE. Patent dated Apr. 3, 1973. Disclaimer filed Jan. 30, 1975, by the assignee, *Addressograph-Multigraph Corporation*.

Hereby enters this disclaimer to claim 9 of said patent.

[*Official Gazette June 24, 1975.*]